United States Patent
Sviberg

(10) Patent No.: US 10,081,236 B1
(45) Date of Patent: Sep. 25, 2018

(54) VEHICLE COMPRISING COVER FOR ROOF OPENING

(71) Applicant: Webasto SE, Stockdorf (DE)

(72) Inventor: Magnus Sviberg, Stockdorf (DE)

(73) Assignee: Webasto SE, Stockdorf (DE)

(*) Notice: Subject to any disclaimer, the term of this patent is extended or adjusted under 35 U.S.C. 154(b) by 0 days.

(21) Appl. No.: 15/637,853

(22) Filed: Jun. 29, 2017

(51) Int. Cl.
*B60J 7/12* (2006.01)
*B60J 7/10* (2006.01)
*B60J 7/08* (2006.01)

(52) U.S. Cl.
CPC ............ *B60J 7/1291* (2013.01); *B60J 7/104* (2013.01); *B60J 7/085* (2013.01)

(58) Field of Classification Search
CPC ....... B60J 7/08; B60J 7/085; B60J 7/10; B60J 7/102; B60J 7/104; B60J 7/1291
USPC .......... 296/107.15, 219, 218, 100.15, 100.16
See application file for complete search history.

(56) References Cited

U.S. PATENT DOCUMENTS

| | | | | | |
|---|---|---|---|---|---|
| 1,784,180 | A | * | 12/1930 | Delale | B60J 7/061 296/219 |
| 1,883,739 | A | * | 10/1932 | Ford | B60J 7/085 296/219 |
| 5,009,465 | A | * | 4/1991 | Induni | B60J 7/08 160/327 |
| 5,207,474 | A | * | 5/1993 | Licher | B60J 7/1265 296/107.15 |
| 5,709,426 | A | * | 1/1998 | DeRees | B60J 7/085 296/135 |
| 2005/0057069 | A1 | * | 3/2005 | McNamara | B60J 7/102 296/100.16 |
| 2017/0217294 | A1 | * | 8/2017 | Lutzka | B60J 7/141 |

FOREIGN PATENT DOCUMENTS

GB 944518 * 12/1963

* cited by examiner

*Primary Examiner* — Dennis H Pedder
(74) *Attorney, Agent, or Firm* — Quarles & Brady LLP

(57) ABSTRACT

A motor vehicle is proposed, comprising a vehicle roof having a roof opening, which is circumferentially limited by a sealing strip or sealing rail, which limits a channel at a side facing toward the roof opening. The roof opening is provided with a cover, which comprises a roof tarp, which has a tensioning rope at its edge for tensioning the roof tarp at the sealing strip, the roof tarp at least partially covering the roof opening.

26 Claims, 17 Drawing Sheets

VEHICLE COMPRISING COVER FOR ROOF OPENING

FIELD OF THE INVENTION

The invention relates to a motor vehicle comprising a cover for a roof opening and to a cover of this kind.

RELATED PRIOR ART

From practice, motor vehicles are known that have a vehicle roof comprising a roof opening. The roof opening can be closed by means of a rigid panel, which thus forms a cover for the roof opening. It is further known for the roof panel to be removable, allowing it to be stored separately from the vehicle. In this configuration, the roof is consequently open in the area of its roof. However, the interior of the vehicle in question may be exposed to unfavorable weather conditions in this case.

The object of the invention is to provide a motor vehicle comprising a cover for a roof opening that is easy to install and that requires little storage space.

SUMMARY OF THE INVENTION

According to a first aspect of the invention, a motor vehicle is proposed that comprises a vehicle roof having a roof opening, which is preferably circumferentially limited by a sealing rail, which, in turn, limits a channel at a side facing toward the roof opening, wherein the roof opening is provided with a cover, which comprises a roof tarp, which has a tensioning rope at its edge, by means of which the roof tarp is tensioned at the sealing rail, the roof tarp at least partially covering the roof opening. The vehicle thus comprises a cover that can be tensioned by means of a tensioning rope at a sealing rail that in particular circumferentially limits a roof opening of a vehicle roof. Mounting of a cover of this kind is particularly easy because the tensioning rope or the edge portion of the roof tarp having the tensioning rope simply needs to be pulled into the channel across the sealing rail. The cover will then rest on or be in contact with the sealing rail preferably in a sealing manner. The sealing rail preferably forms an undercut, into which the tensioning rope engages.

In particular, the cover can form a means for covering the entire surface of the roof opening. Water management can take place via the channel, which is limited by the sealing rail. The easily handled cover does not require any modifications in an existing motor vehicle that has at least one removable roof panel covering a roof opening, for example, because a roof of this kind usually already has a circumferential sealing rail.

The cover, which is formed by the roof tarp, requires little storage space because a tarp can be folded and/or rolled. Thus, when in the unmounted state, the cover can be carried along in the vehicle in question in a space-saving manner. Furthermore, it can be produced at little cost and can also have little weight.

In a preferred embodiment of the motor vehicle according to the invention, the tensioning rope of the cover is accommodated in an edge pocket or in a hem of the roof tarp. Thus, the tensioning rope is an integrated part of the roof tarp.

In order to be able to easily pull the roof tarp across the sealing rail during mounting, the sealing rail preferably having a vertical orientation, the roof tarp preferably has a fixing strip at its edge, said edge being in particular circumferential, the fixing strip being connected to a middle section of the roof tarp via a seam or a glued connection, for example. The fixing strip allows preventing excessive gather of the roof tarp in its edge area.

A particularly mounting-friendly embodiment of the cover of the motor vehicle according to the invention comprises a tensioning device for the tensioning rope. By means of the tensioning device, which can consist of a conventional lever tensioning mechanism, the tension required for fixing the cover to the sealing rail can be introduced into the tensioning rope and the tensioning rope can be adjusted between a tensioned position and a slackened position.

To facilitate mounting, the tensioning rope can be rubber-elastic.

In order to be able to even better secure the cover to the vehicle roof, a preferred embodiment has at least one retaining flap at the underside of the roof tarp. The retaining flap can in particular be fixed to a roof frame or also to another structural component of the vehicle roof and can comprise a fixing device. The fixing device, which is realized as a snap fastener, bayonet lock, hook-and-loop closure or the like, is engaged with a corresponding counterpart, which is formed on the vehicle roof, when the retaining flap is in the fixed state.

In a preferred embodiment, in order to predefine a shape of the cover, the roof tarp has at least one stiffening bar which extends in the transverse direction of the roof. The stiffening bar, which is realized in the manner of a sail batten or in the manner of a transverse roof bow, partially predefines the shape of the roof tarp when the stiffening bar is in its mounted state.

In a preferred embodiment, a section of the roof tarp is rollable so as to be able to at least partially uncover the roof opening when the cover is mounted. The rolling behavior of the roof tarp can be improved in particular by integrating at least one stiffening bar into the roof tarp.

For securing the rollable section in the rolled-up state, the roof tarp preferably has at least one retaining ribbon, which surrounds the rollable section and which is fixed to a counterpart.

In a special embodiment, the front-side edge of the roof tarp of the cover proposed according to the invention limits a partial section of the roof opening in which a roof closing element is arranged.

The roof closing element, which is preferably removable, can be formed by a tensioning tarp, which has a tensioning rope at its edge and which can consequently be realized in correspondence with the roof tarp, namely having the features described above, too.

Alternatively, the roof closing element can be a rigid roof section, which can be attached to the vehicle roof by means of a releasable fixing device.

In another alternative embodiment, the roof closing element is a convertible roof insert, which is realized in the manner of a folding roof, for example.

In order to be able to produce a wind- and water-proof connection between the roof tarp and the roof closing element, the roof tarp is preferably connected to the roof closing element via a connecting element.

The connecting element can comprise a hook-and-loop connection and/or a retaining flap having a retaining profile that engages into a retaining groove.

According to another aspect, a cover for a roof opening of a motor vehicle is proposed, comprising a roof tarp that is circumferentially provided with a tensioning rope at its edge, by means of which the roof tarp can be tensioned to a roof sealing rail circumferentially limiting the roof opening.

Other advantages and advantageous embodiments of the subject-matter of the invention are apparent from the description, the drawing and the claims.

BRIEF DESCRIPTION OF THE DRAWING

Embodiment examples of a vehicle roof according to the invention are illustrated in the drawing in a schematically simplified manner and will be explained in more detail in the following description.

DETAILED DESCRIPTION OF THE PREFERRED EMBODIMENTS

Figure 1:
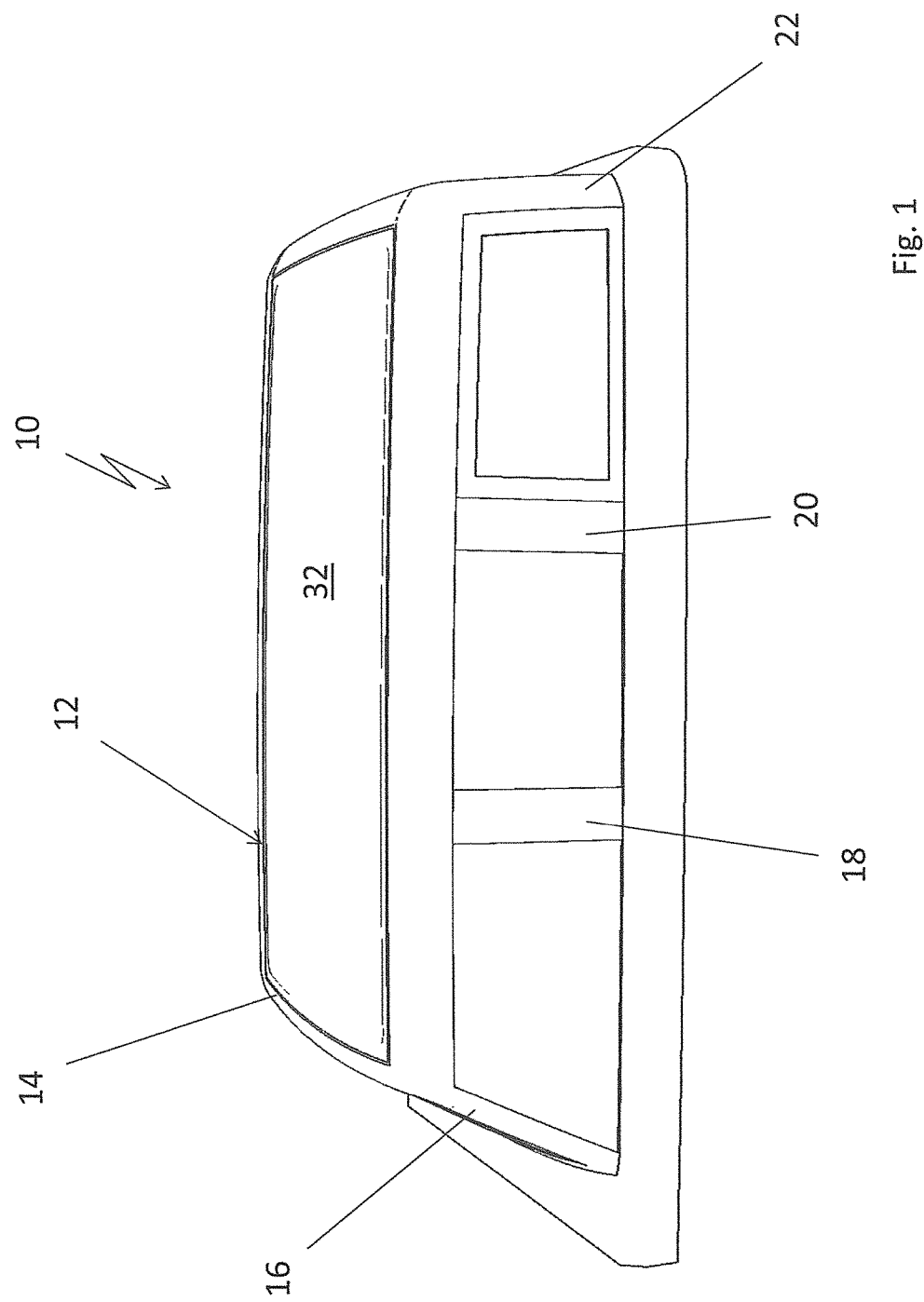
FIG. 1 shows a motor vehicle having a vehicle roof whose roof opening is closed by a rigid roof panel.

In FIGS. 1 to 8, a motor vehicle 10 is illustrated which has a vehicle roof 12 provided with a roof opening 14, which has a rectangular outline. In the case at hand, the motor vehicle 10 is realized in the manner of an all-terrain vehicle or as a so called SUV (sports utility vehicle) and comprises, on both sides with respect to the vertical longitudinal center plane of the vehicle and viewed in the longitudinal direction of the vehicle, an A-column 16, which limits a windshield of the motor vehicle 10 at the sides, a B-column 18, a C-column 20, and a rear-side D-column, which limits a back door (not illustrated) at the sides.

The roof opening 14 is circumferentially limited by a roof frame 24. As can be seen in particular in FIG. 7, the roof frame 24 comprises a circumferential water channel 26, which can be drained via suitable drain channels. At its edge facing the roof opening 14, the water channel 26 is limited by a circumferential channel wall 28, which is a sealing rail and which is provided with a sealing strip 30 made of plastic, which is plugged onto the channel wall 28 from above and has a vertical orientation.

Figure 2:
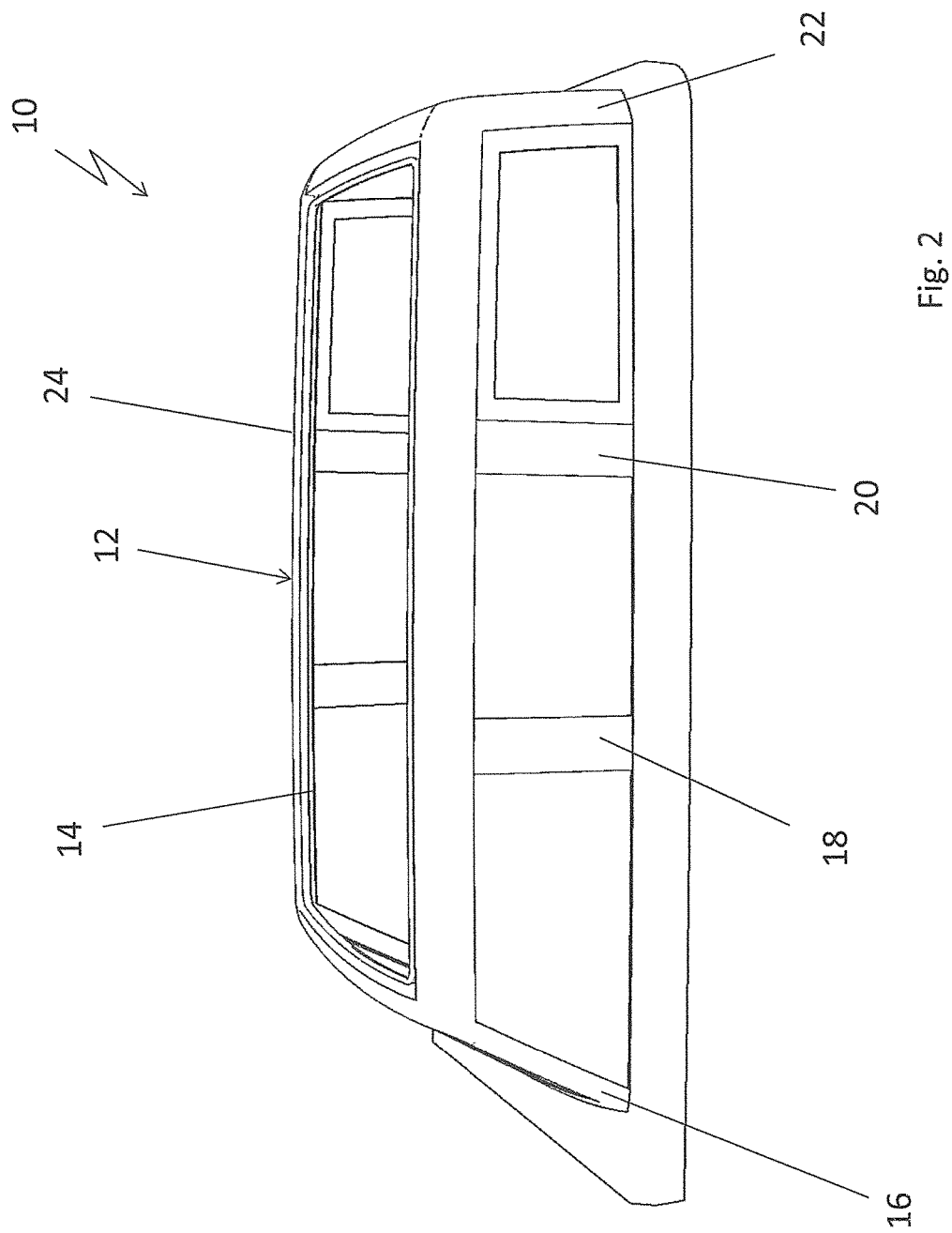
FIG. 2 shows a view corresponding to FIG. 1, but with the roof panel removed.
Figure 3:
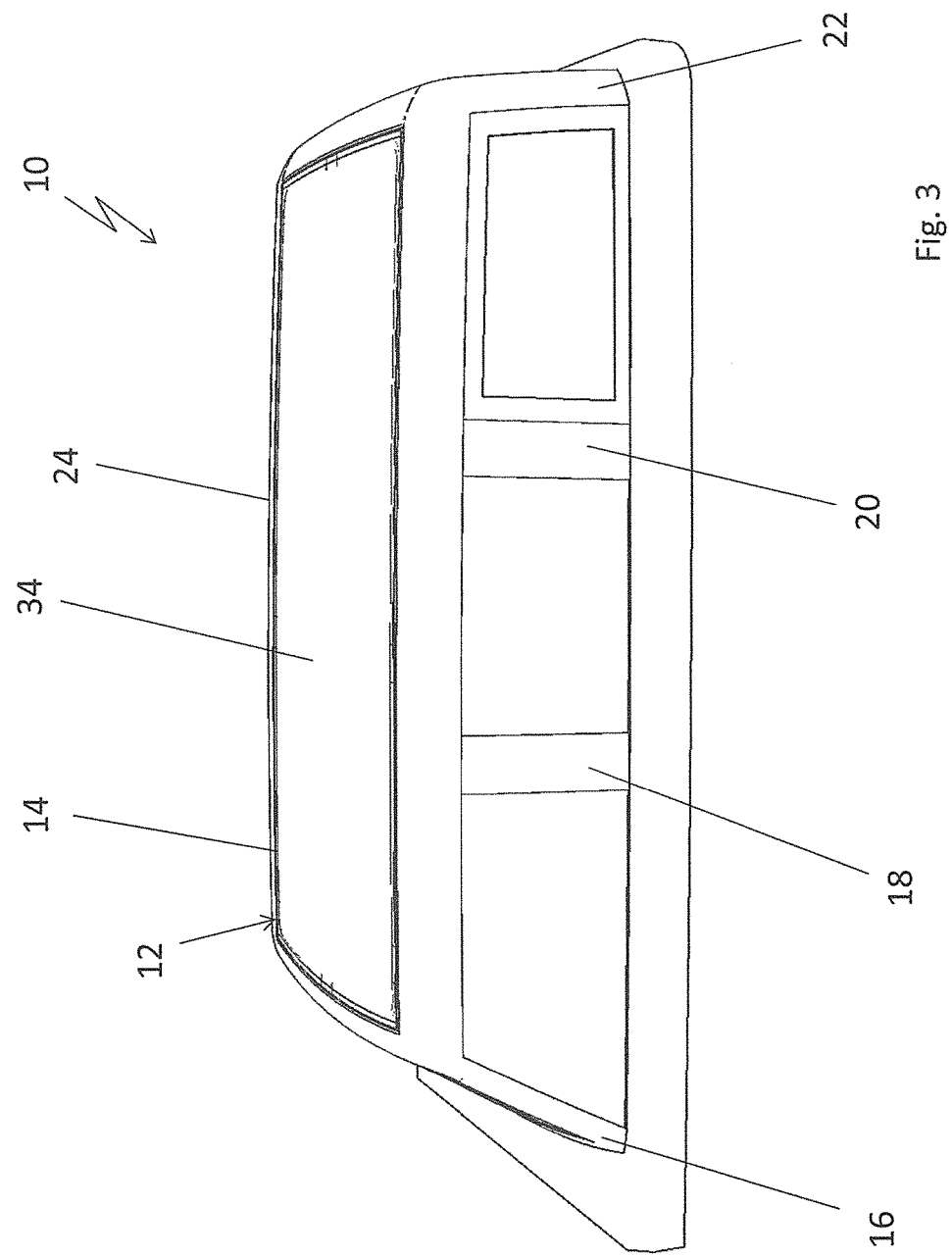
FIG. 3 also shows a view corresponding to FIG. 1, but including a cover realized according to the invention.
Figure 4:
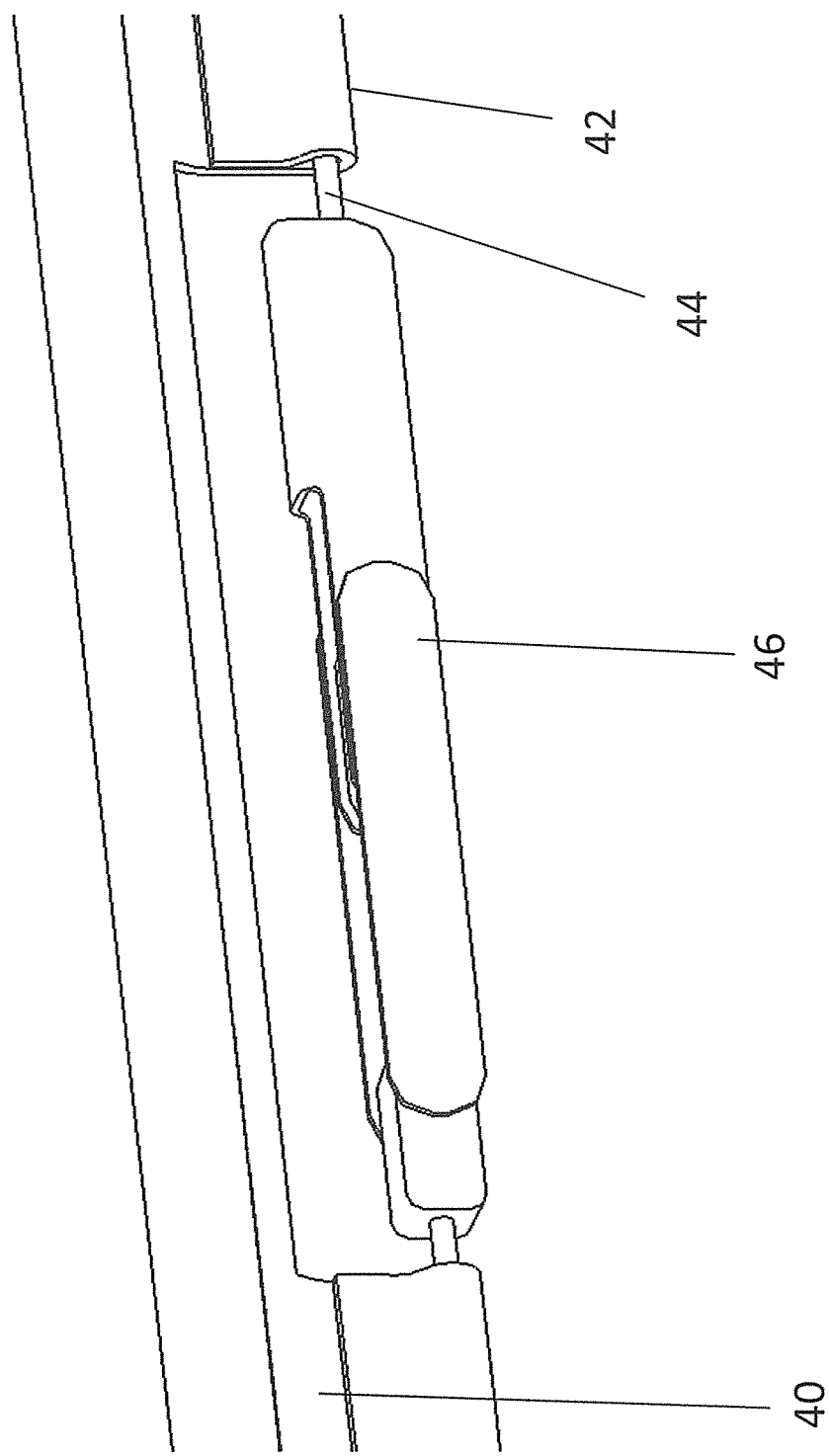
FIG. 4 shows a tensioning device of the cover.
Figure 5:
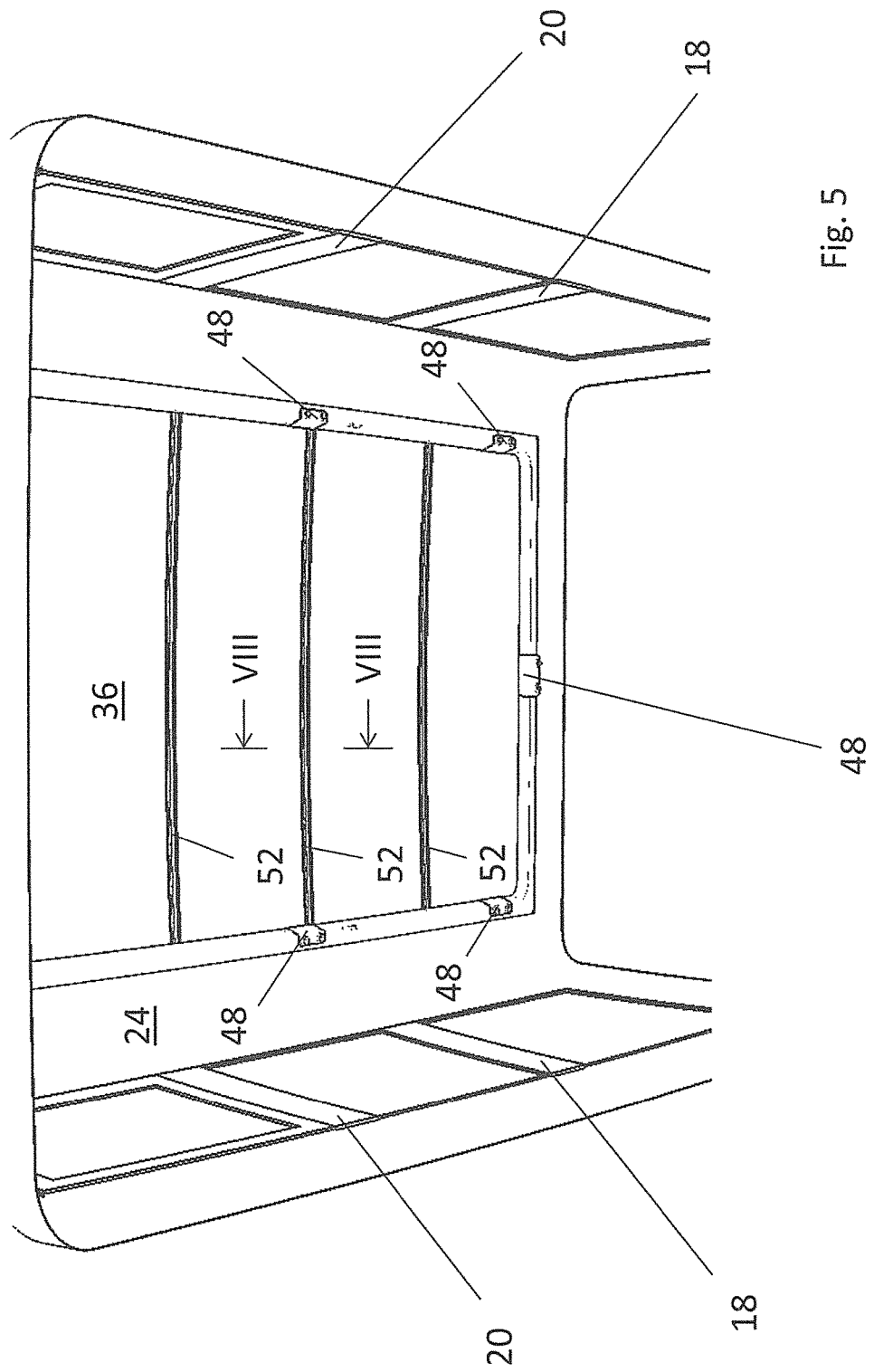
FIG. 5 shows an interior view of the vehicle roof.
Figure 6:
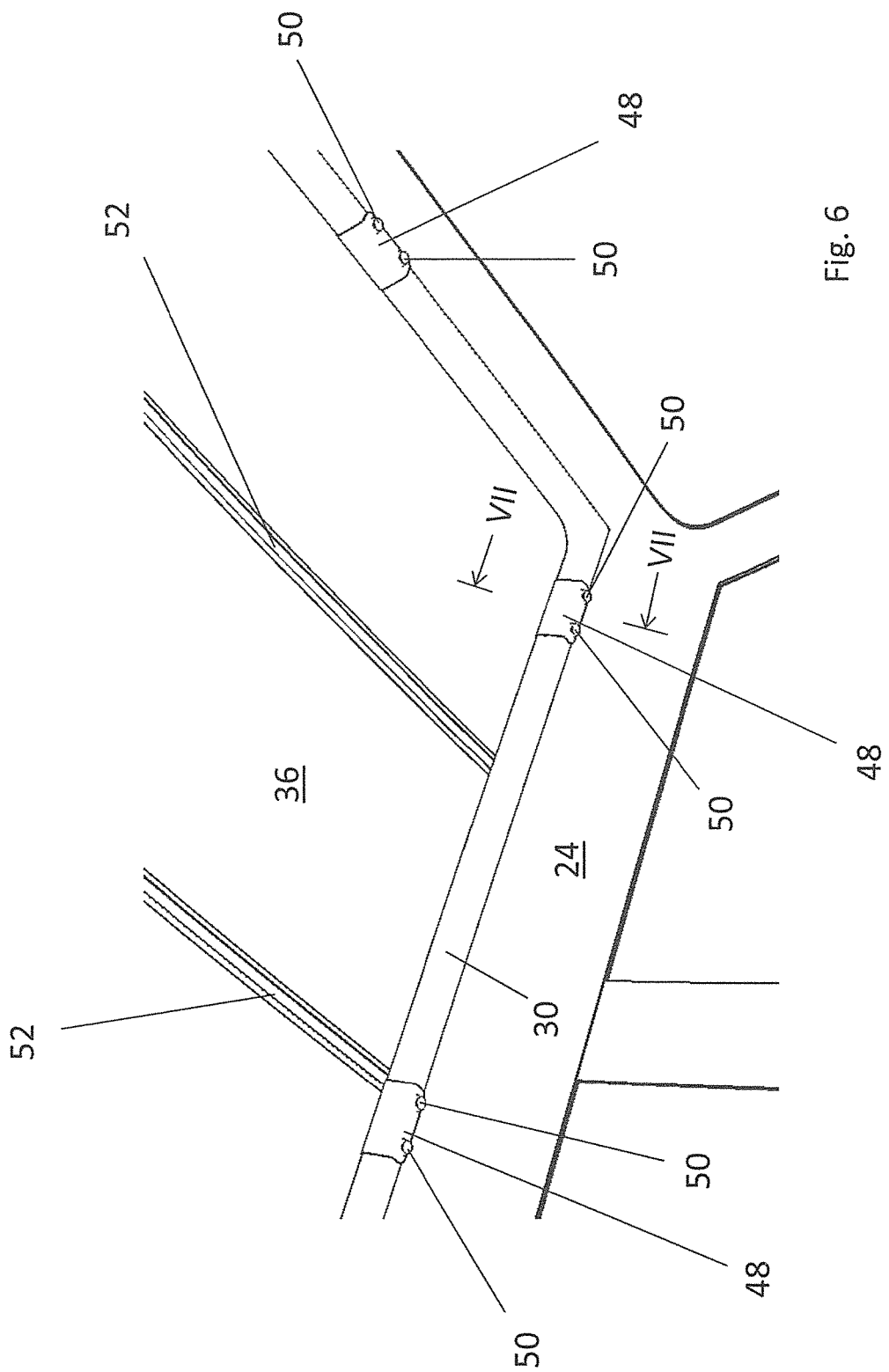
FIG. 6 shows an enlarged illustration of a corner portion of the vehicle roof in an interior view.

In the configuration illustrated in FIG. 1, the roof opening 14 is closed by a rigid roof panel 32. The roof panel 32 is removable and can be stored separately from the vehicle 10. The resulting configuration featuring an uncovered roof opening 14 is illustrated in FIG. 2. In the mounted state, the roof panel 32 rests on the sealing strip 30.

In order to be able to close the roof opening 14 in an alternative manner, the motor vehicle 10 is equipped with a cover 34 which can be mounted instead of the roof panel 32 and which is realized as a foldable and/or rollable roof tarp. The roof tarp, which is produced from a wind-proof and weather-proof material, comprises a substantially rectangular middle section 36, which covers the roof opening 14 when the cover 34 is in the mounted state and which is provided with a circumferential fixing strip 40 at its edge via a connecting strip 38 or alternatively via a seam. The fixing strip 40 has a hem 42, in which a tensioning rope 44 is accommodated. In the mounted position, illustrated in FIGS. 3 to 8, because of the tensioning force of the tensioning rope 44, the fixing strip 40 is in flush contact with a foot portion of the sealing strip 30, which is made of plastic, the foot portion forming an undercut.

In order to be able to adjust the tensioning rope 44 between a tensioned position and a slackened position when mounting the cover, the tensioning rope has a tensioning device 46 in a portion of the fixing strip 40 that is free of edge pockets and free of a hem, said tensioning device 46 being accessible from outside the vehicle and preferably being formed by a quick clamp.

Figure 7:
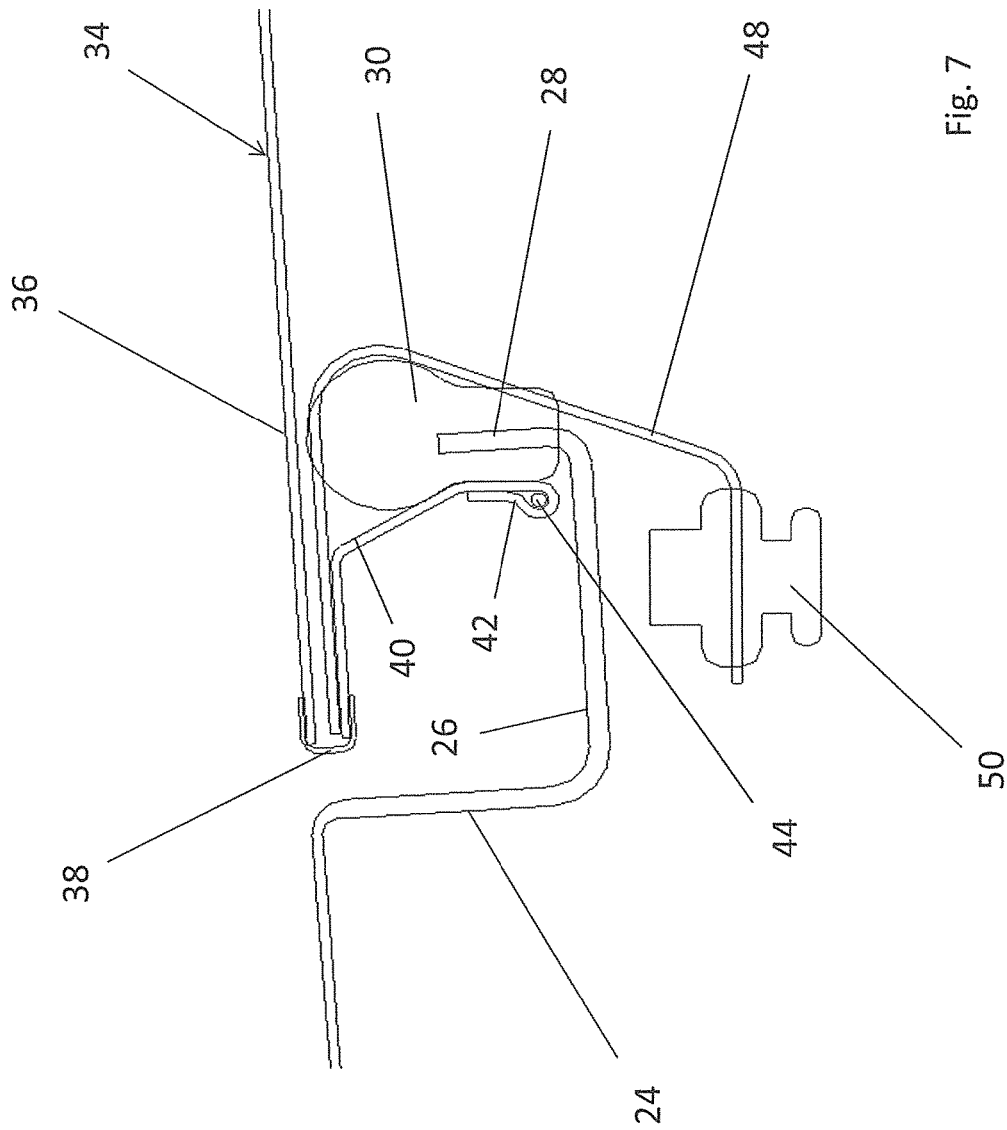
FIG. 7 shows a cross-section through the vehicle roof along line VII-VII in FIG. 6.
Figure 8:
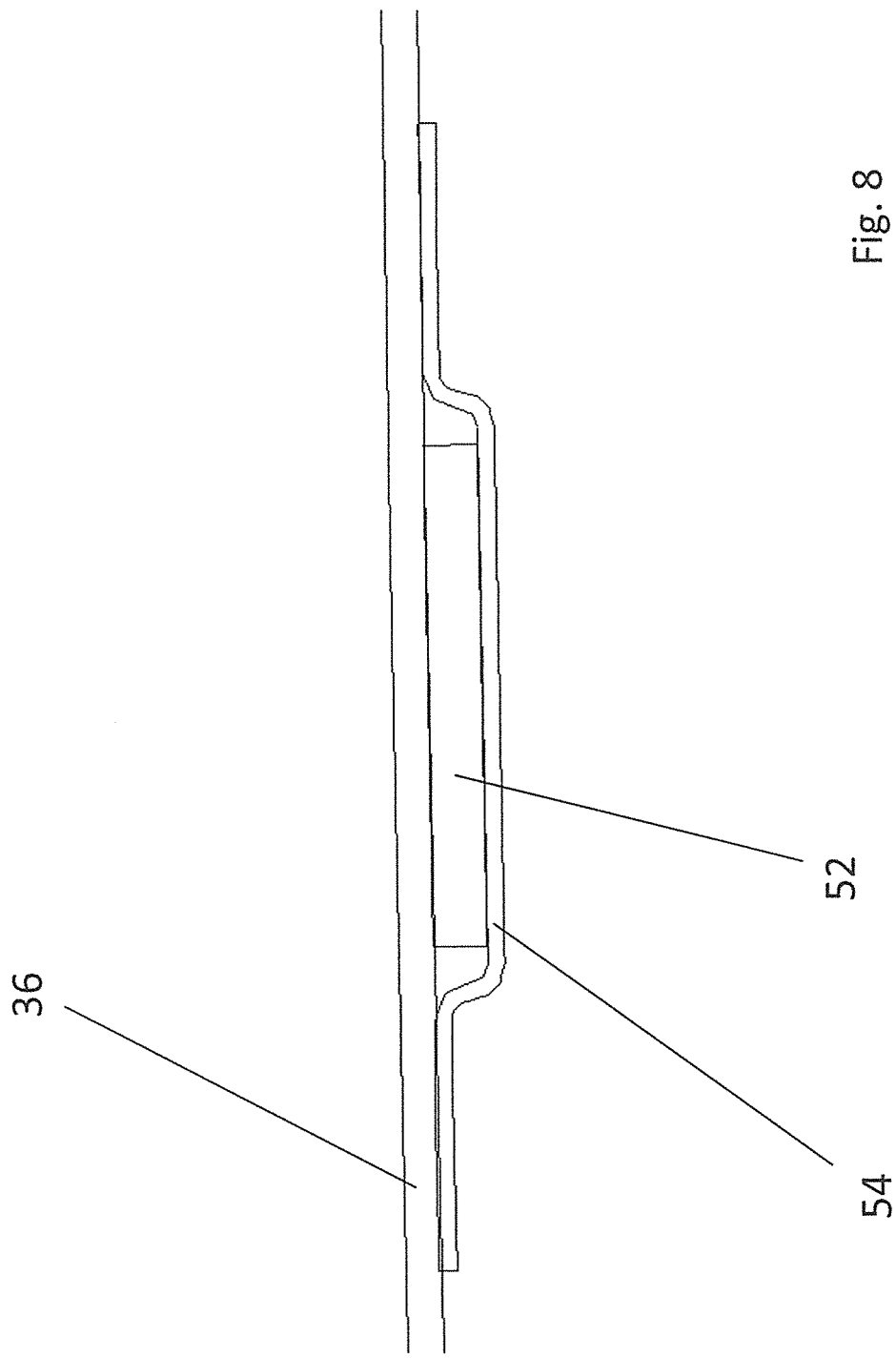
FIG. 8 shows a cross-section through the cover along line VIII-VIII in FIG. 5.

In order to be able to solidly connect the cover 34 to the superstructure of the motor vehicle 10 and to minimize the risk of the cover 34 coming loose during travel of the motor vehicle 10, the cover 34 has multiple retaining flaps 48 at its circumference, which, as can be seen in FIG. 7, can be fixed to the roof frame 24 via snap fasteners 50.

The middle section 36 of the cover 34 realized as a roof tarp is provided with stiffening bars 52, which extend in the transverse direction of the roof and which at least partially predefine the shape of the mounted cover. For accommodating the stiffening bars 52, the middle section 36 has pockets 54 at its underside, which are formed by corresponding glued, sewn or welded fabric strips.

Figure 9:
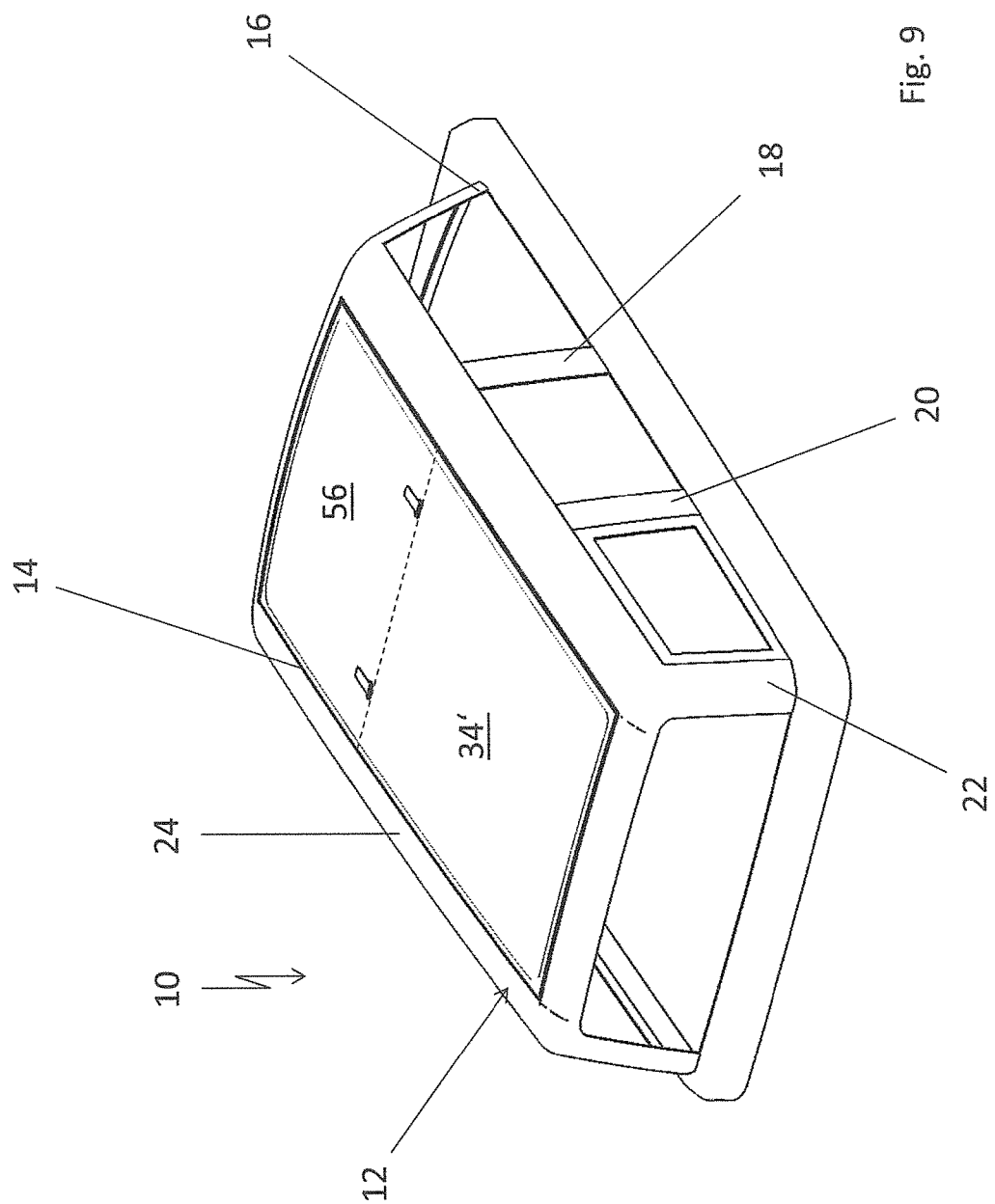
FIG. 9 shows a motor vehicle having an alternative embodiment of a cover for a roof opening.
Figure 10:
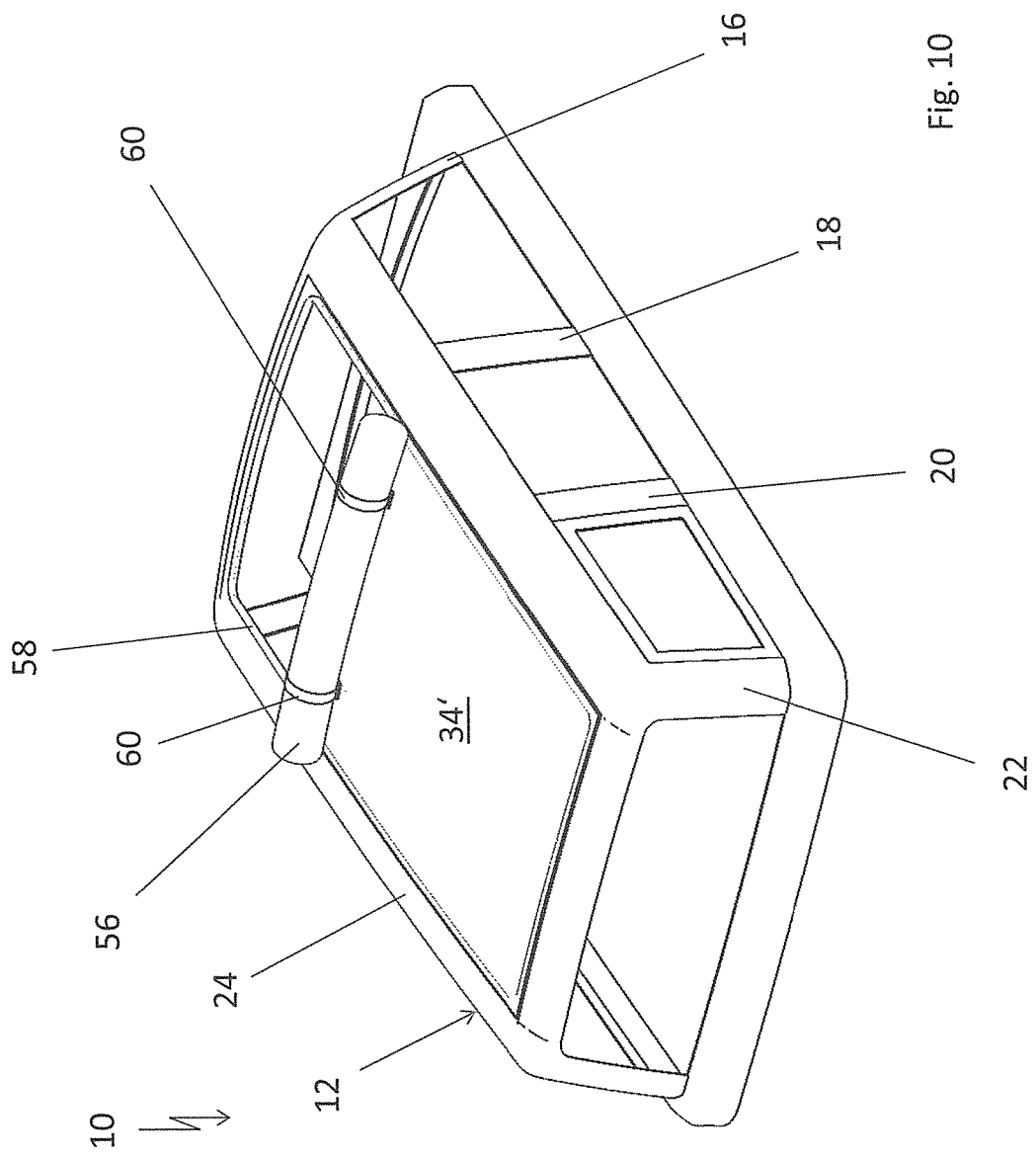
FIG. 10 shows a view corresponding to FIG. 9, but including a rolled-up section of the cover.
Figure 11:
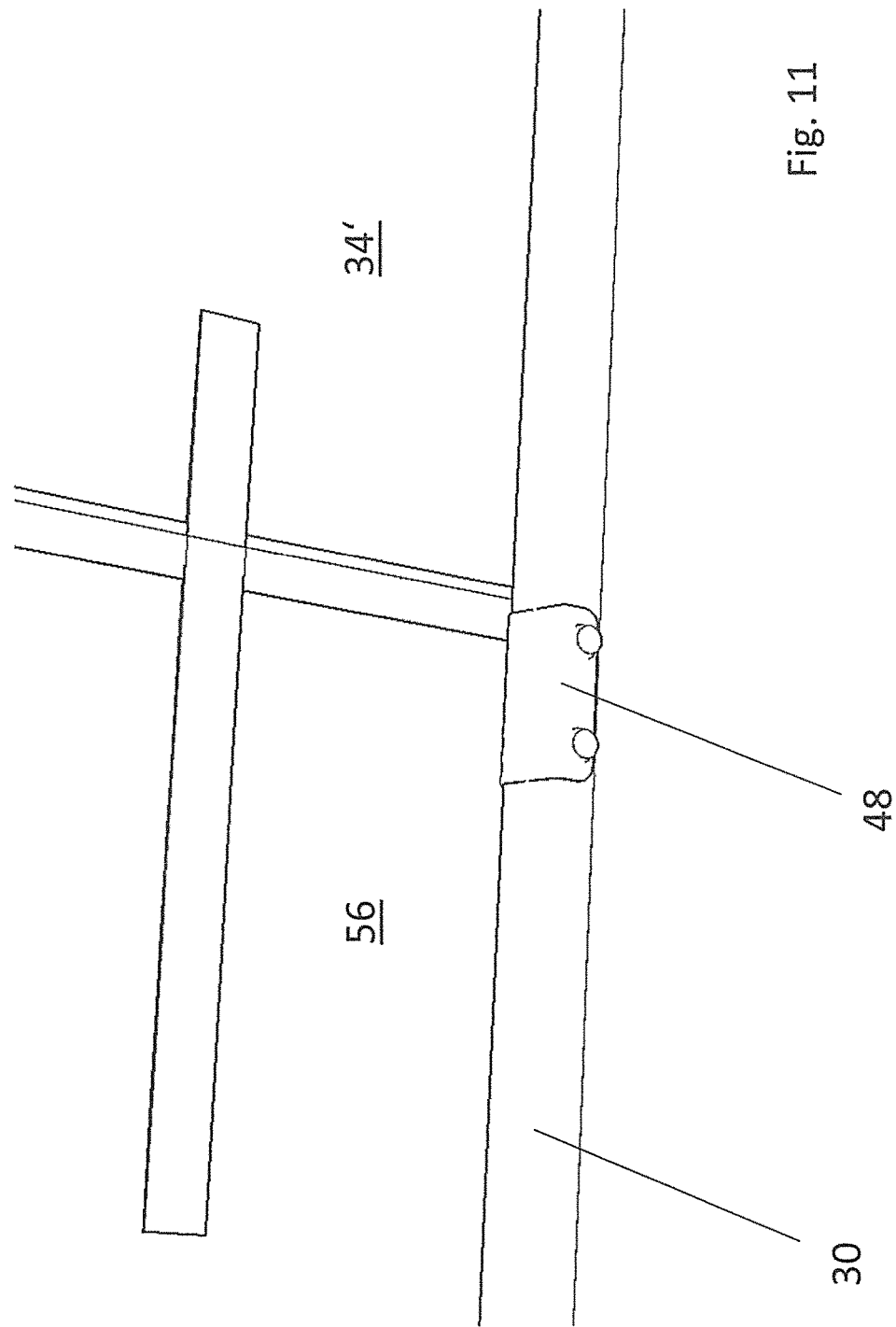
FIG. 11 shows a fixing device for the rollable section.
Figure 12:
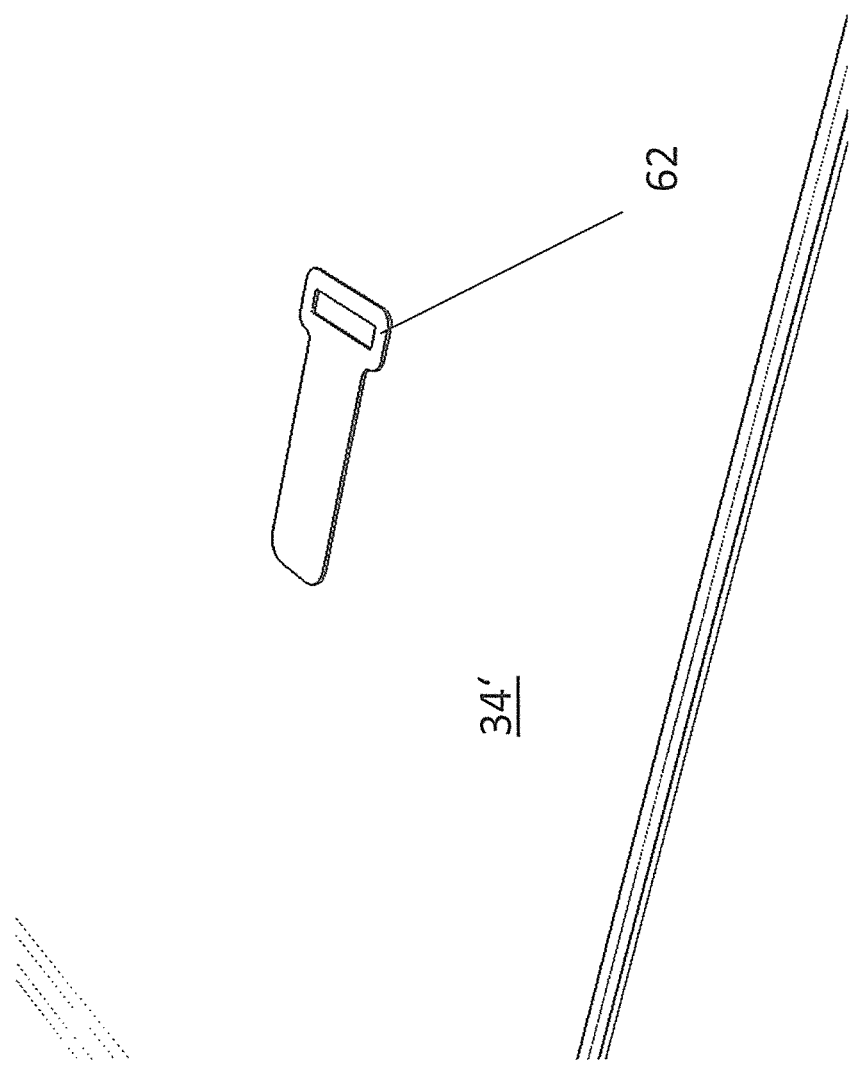
FIG. 12 shows a retaining lug for the fixing device.

In FIGS. 9 to 12, and motor vehicle 10 is illustrated which basically corresponds to the motor vehicle described above, but differs therefrom in a cover 34' of an alternative design. The cover 34' basically has the structure of the embodiment in the form of the roof tarp illustrated in FIGS. 3 to 8, but differs from it in that, in a front-side portion 58 of the roof opening 14, it has a rollable section 56 by means of which the front-side portion 58 of the roof opening can be selectively uncovered (FIG. 10) or closed (FIG. 9).

For securing the rollable section 56 when the front-side portion 58 is open, the cover 34' is provided with two retaining ribbons 60, which surround the rollable section 56 when it is in its rolled-up state and which can be secured to the upper side of the middle section 36 with retaining lugs 62.

Otherwise, the cover 34' corresponds to the cover 34 according to FIGS. 3 to 8.

Figure 13:
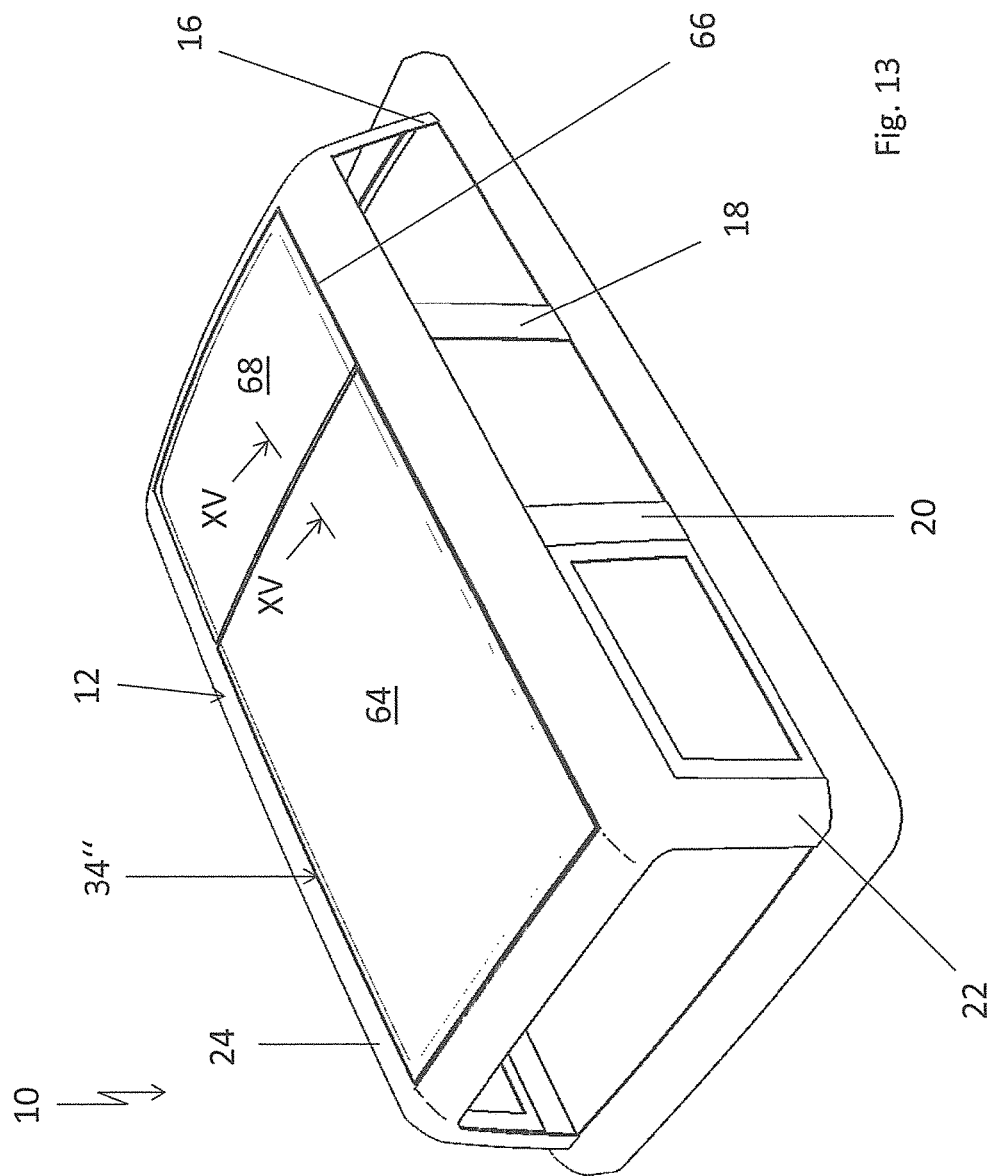
FIG. 13 shows a vehicle roof including an alternative embodiment of a cover according to the invention, which is adjacent to a front-side roof closing element.
Figure 14:
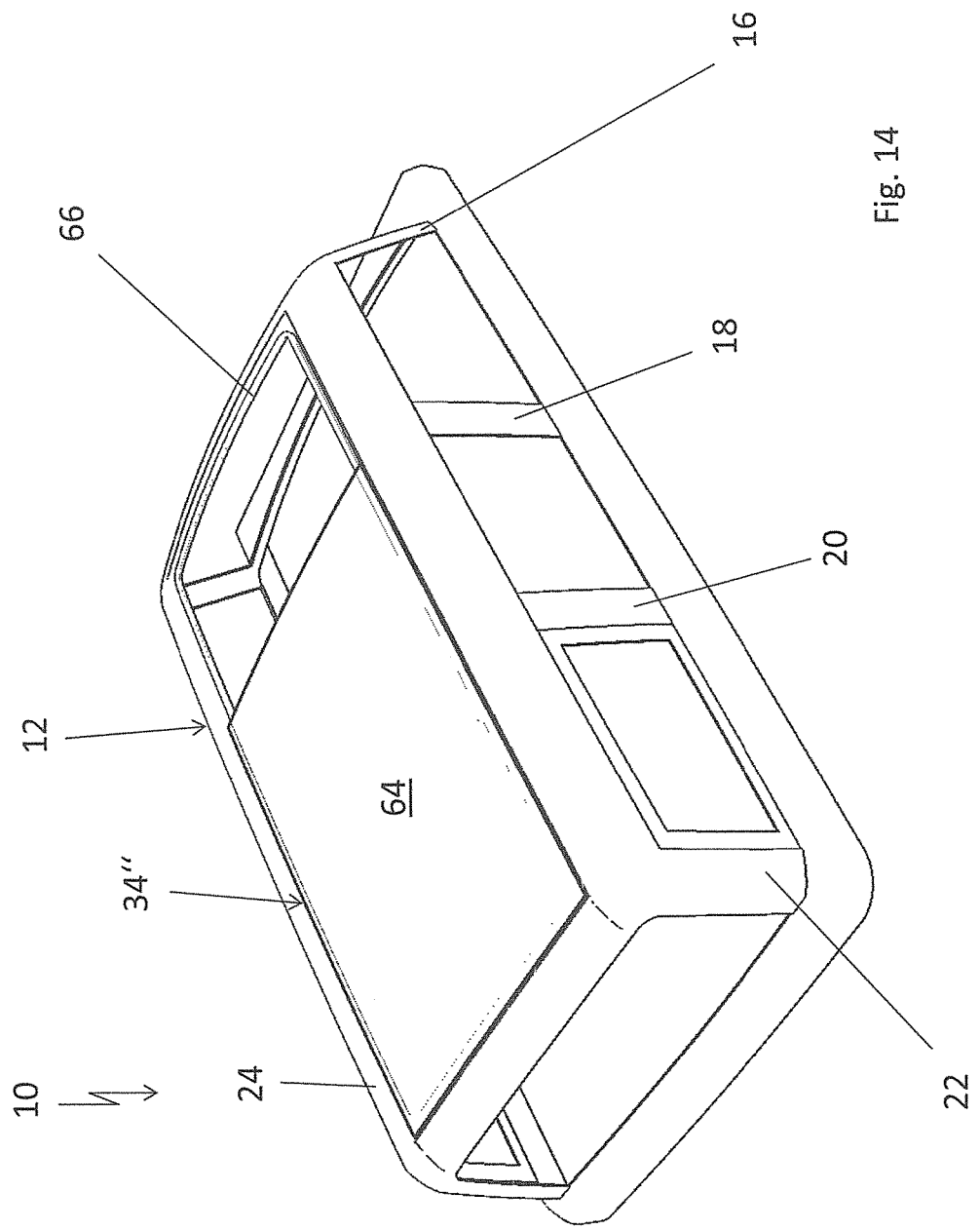
FIG. 14 shows the vehicle roof according to FIG. 13, but with the roof closing element removed.
Figure 15:
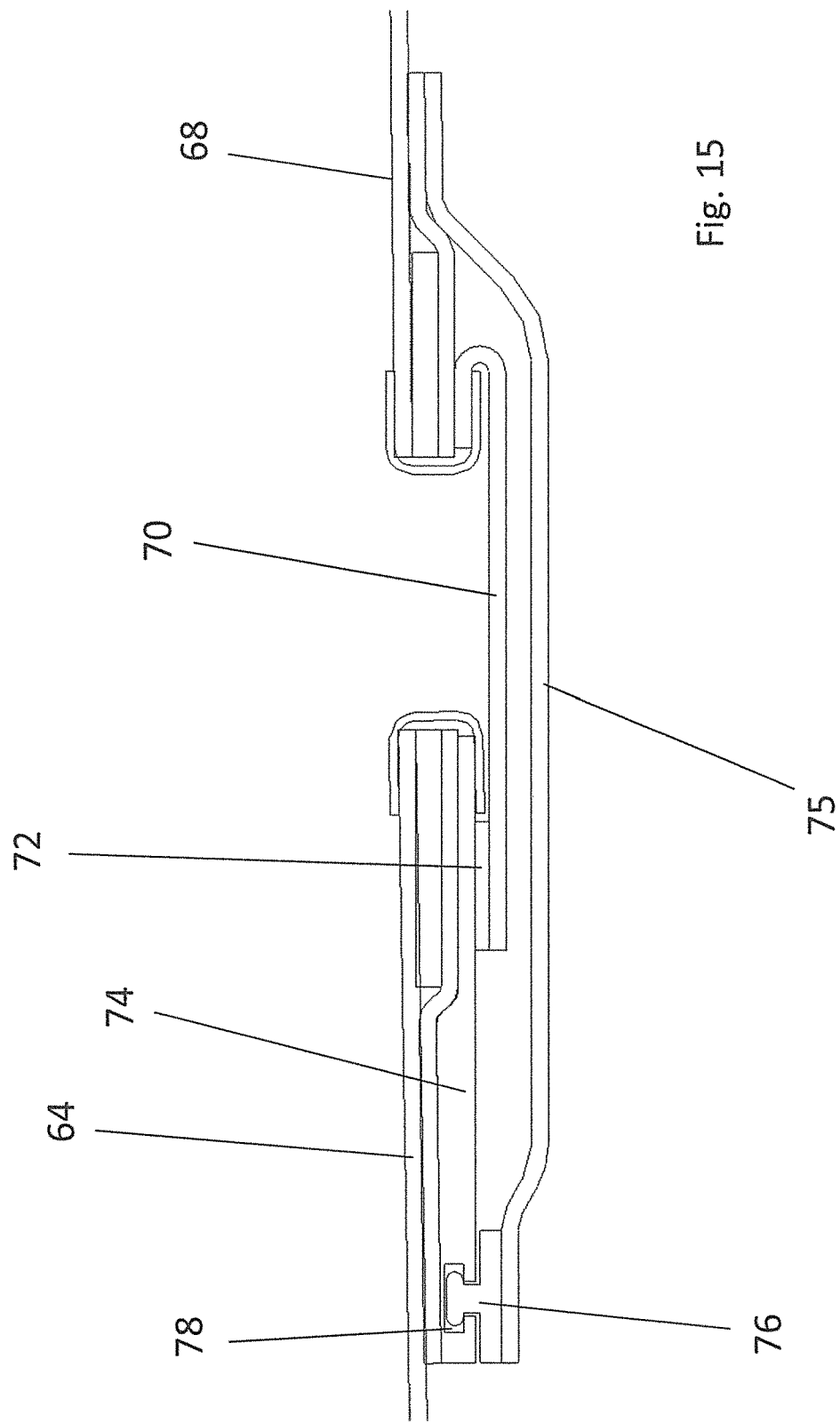
FIG. 15 shows a cross-section along line XV-XV in FIG. 13.

In FIGS. 13 to 15, too, a motor vehicle 10 of the kind described above is illustrated, which, however, is provided with an alternative embodiment of a cover 34". The cover 34" comprises a roof tarp 64 which is realized in correspondence with the roof tarps described above and which has a middle section to which a fixing strip 40 is connected in the edge portion, said fixing strip 40 having a tensioning rope 44, via which the roof tarp 64 can be fixed to a sealing strip 30 of the vehicle roof 12 or, more precisely, of the roof frame 24.

With its front-side edge, the roof tarp 64 limits a partial section 66 of the roof opening 14, which can be closed with a separate roof closing element 68, which is realized as a tensioning tarp. The roof closing element 68 can be loosened from the vehicle roof 12 separately in order to open the partial section 66 (cf. FIG. 14). In the mounted state, which is illustrated in FIGS. 13 and 15, the roof closing element 68 realized as a tensioning tarp is mounted on the circumferential sealing strip of the roof frame 24 via a circumferential tensioning rope in correspondence with roof tarp 64.

At the rear-side edge, the roof closing element 68 is connected to a connecting strip 74 of the roof tarp 64 via a connecting flap 70, which has a hook-and-loop element 72. Moreover, the roof closing element 68 has a second connecting flap 75, which is connected to the roof tarp 64 via a sealing strip 76, which constitutes a retaining profile and which engages into a T-groove 78 of the connecting strip 74, said T-groove 78 constituting a retaining grove. In this way, a sealing connection can be produced between the roof closing element 68 and the roof tarp 64.

Figure 16:
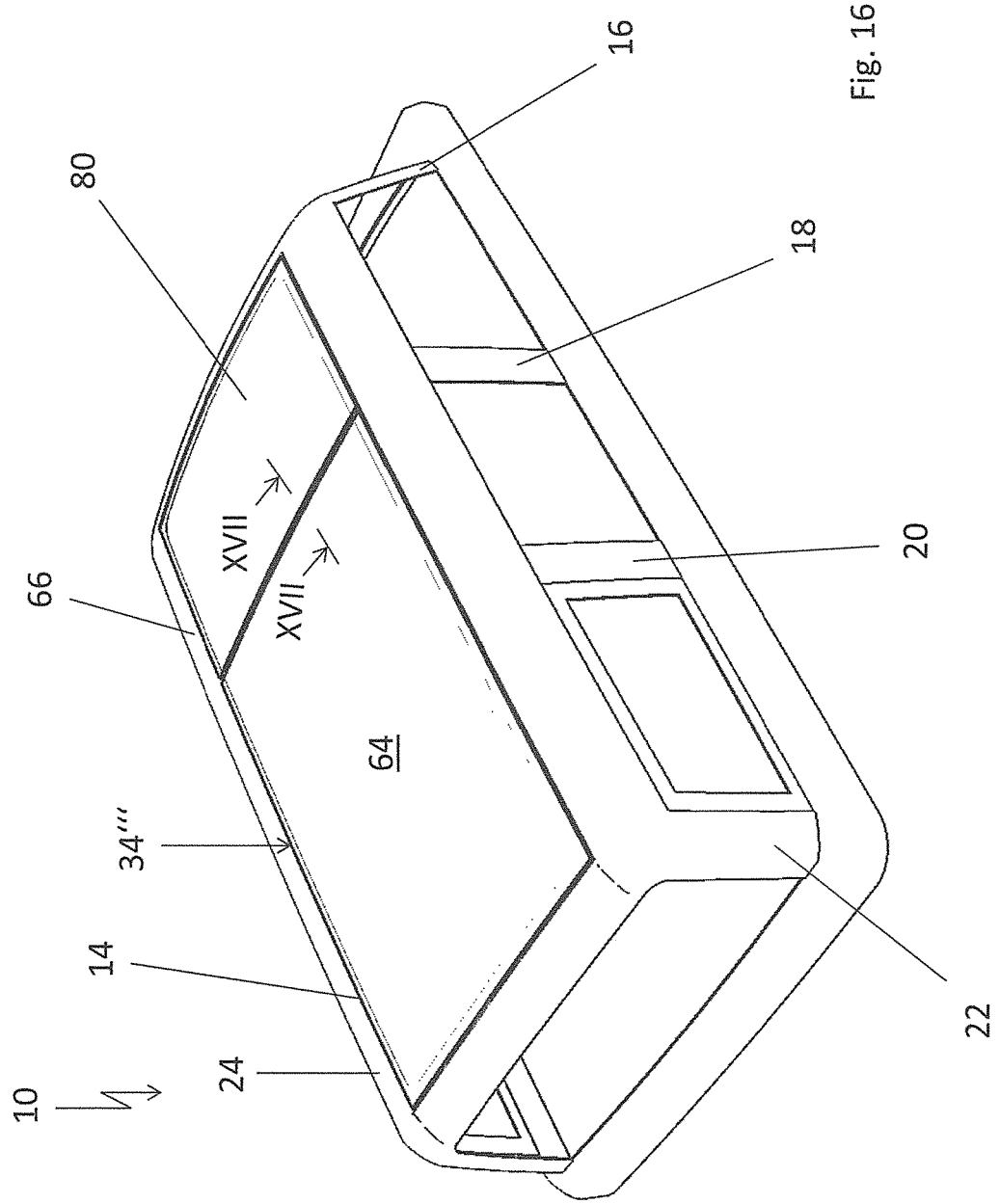
FIG. 16 shows another embodiment of a motor vehicle having a cover realized according to the invention and a front-side roof closing element.
Figure 17:
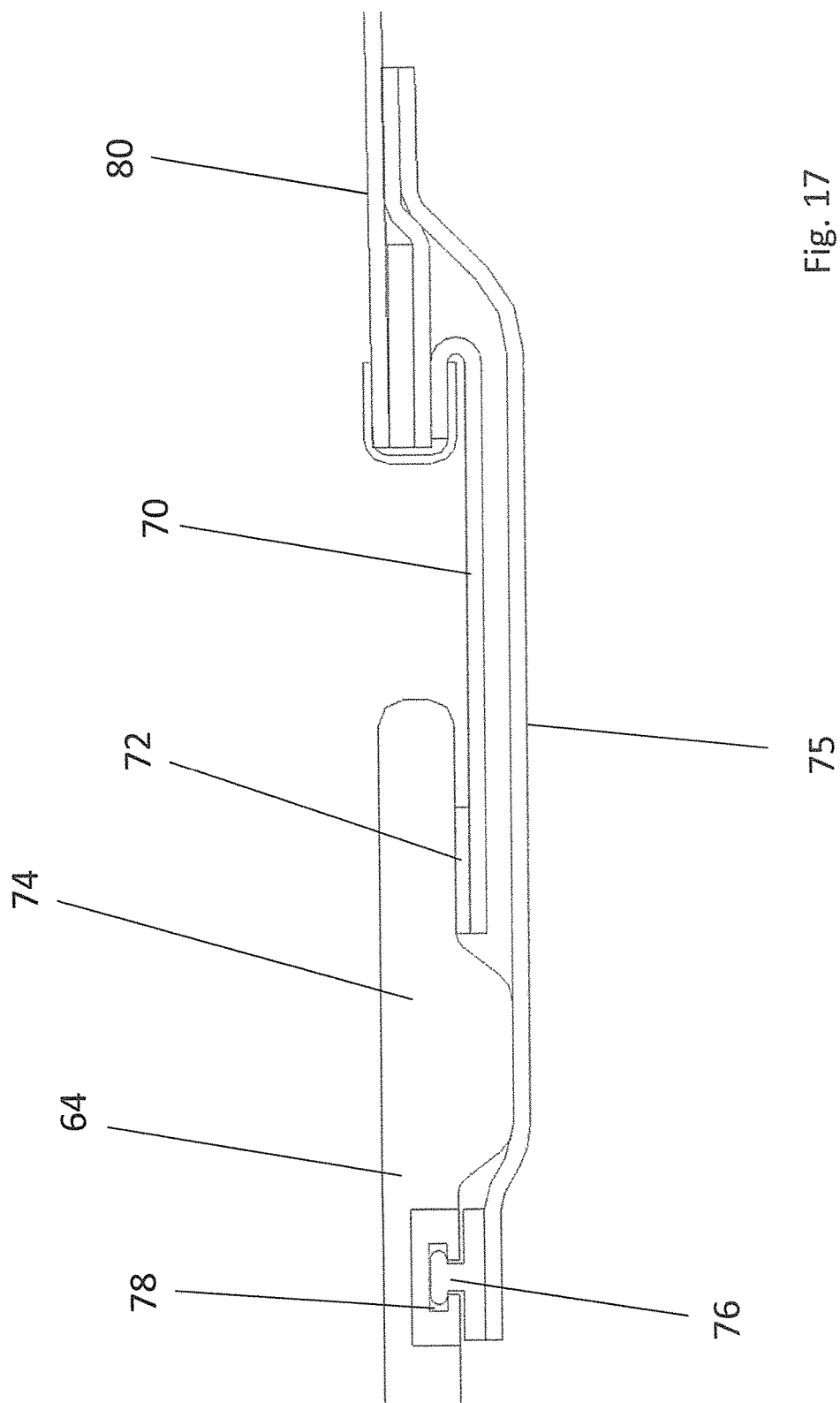
FIG. 17 shows a cross-section through the cover and the roof closing element according to FIG. 16 along line XVII-XVII in FIG. 16.

In FIGS. 16 and 17, another embodiment of a cover 34''' is illustrated. Corresponding to the embodiment according to FIGS. 13 to 15, the cover 34''' comprises a roof tarp 64, the front-side edge of which limits a partial section 66 of the roof opening 14 and which is attached to a sealing strip 30 of the vehicle roof 12 via a tensioning rope 24. In the partial section 66, a roof closing element 80 is arranged, which is realized as a rigid roof panel or as a folding roof element and which can be loosened and actuated separately. The roof closing element 80 arranged on the circumferential sealing strip 30 of the roof frame 24 is connected to the roof tarp 64 or, more precisely, to a connecting strip 74 of the roof tarp 64 via two connecting flaps 70 and 75 in correspondence with the roof closing element according to FIGS. 13 to 15. The connecting flap 70 is connected to the connecting strip 74 of the roof tarp 64 from below via a hook-and-loop element 72. At its free edge, the connecting flap 75 has a sealing strip 76, which engages into a T-groove 78 of the connecting strip 74 of the roof tarp 64. The roof closing element 80 is screwed or snap-locked to the vehicle roof 12. Otherwise, the cover 34''' corresponds to the cover illustrated by FIGS. 13 to 15.

REFERENCE SIGNS 10 motor vehicle
12 vehicle roof
14 roof opening
16 A-column
18 B-column
20 C-column
22 D-column
24 roof frame
26 water channel
28 channel wall
30 sealing strip
32 roof panel
34 cover
34' cover
34" cover
34''' cover
36 middle section
38 connecting strip
40 fixing strip
42 edge pocket
44 tensioning rope
46 tensioning device
48 retaining flap
50 snap fastener
52 stiffening bar
54 pocket
56 rollable section
58 front-side portion
60 retaining ribbon
62 retaining lug
64 roof tarp
66 partial section
68 roof closing element
70 connecting flap
72 hook-and-loop element
74 connecting strip
75 connecting flap
76 sealing strip
78 T-groove
80 roof closing element

The invention claimed is:

1. A motor vehicle, comprising a vehicle roof having a roof opening, which is circumferentially limited by a sealing strip or sealing rail encompassing the entire roof opening, which limits a channel at a side facing toward the roof opening, wherein the roof opening is provided with a cover, which comprises a roof tarp releasably coupled to the roof, which has a tensioning rope at its edge for tensioning the roof tarp at the sealing strip or sealing rail, the roof tarp at least partially covering the roof opening.

2. The motor vehicle according to claim 1, wherein the tensioning rope is accommodated in an edge pocket of the roof tarp.

3. The motor vehicle according to claim 1, wherein the roof tarp has a fixing strip at its edge, the fixing strip being connected to a section of the roof tarp.

4. The motor vehicle according to claim 1, wherein the tensioning rope is provided with a tensioning device for adjusting the tensioning rope between a tensioned position and a slackened position.

5. The motor vehicle according to claim 1, wherein the tensioning rope is rubber-elastic.

6. The motor vehicle according to claim 1, wherein the roof tarp has at least one retaining flap on its underside, said retaining flap being fixable to a roof frame of the vehicle roof.

7. The motor vehicle according to claim 6, wherein the retaining flap comprises a fixing device, which interacts with the roof frame.

8. The motor vehicle according to claim 1, wherein the roof tarp accommodates at least one stiffening bar, which extends in the transverse direction of the roof.

9. The motor vehicle according to claim 1, wherein a section of the roof tarp can be rolled in order to uncover a portion of the roof opening.

10. The motor vehicle according to claim 9, wherein the roof tarp has at least one retaining ribbon for securing the rollable section in its rolled-up state.

11. The motor vehicle according to claim 1, wherein the front-side edge of the roof tarp limits a partial section of the roof opening in which a roof closing element is arranged.

12. The motor vehicle according to claim 11, wherein the roof closing element is formed by a tensioning tarp, which has a tensioning rope at its edge.

13. The motor vehicle according to claim 11, wherein the roof closing element is a rigid roof segment.

14. The motor vehicle according to claim 11, wherein the roof closing element is a folding-top insert.

15. The motor vehicle according to claim 11, wherein the roof tarp is connected to the roof closing element via a connecting element.

16. The motor vehicle according to claim 15, wherein the connecting element comprises a hook-and-loop connection.

17. The motor vehicle according to claim 14, wherein the connecting element comprises a retaining flap having a retaining profile which engages into a retaining groove.

18. A cover for a roof opening of a motor vehicle, comprising a roof tarp adapted to be releasably coupled to a roof of the motor vehicle, which is circumferentially provided with a tensioning rope at its edge for tensioning the roof tarp at a sealing strip or sealing rail encompassing the entire roof opening and circumferentially limiting the roof opening.

19. The cover according to claim 18, wherein the tensioning rope is accommodated by an edge pocket of the roof tarp.

20. The cover according to claim 18, wherein the roof tarp has a circumferential fixing strip, which comprises the edge pocket and which is connected to a section of the roof tarp.

21. The cover according to claim 18, wherein the tensioning rope is provided with a tensioning device for adjusting the tensioning rope between a tensioned position and a slackened position.

22. The cover according to claim 18, wherein the tensioning rope is rubber-elastic.

23. The cover according to claim 18, wherein the roof tarp has at least one retaining flap on its underside, said retaining flap being fixable to a roof frame of the vehicle roof.

24. The cover according to claim 21, wherein the retaining flap comprises a fixing device.

25. The cover according to claim 18, wherein the roof tarp is provided with at least one stiffening bar which extends in the transverse direction of the roof.

26. The cover according to claim 18, wherein a section of the roof tarp can be rolled in order to uncover a portion of the roof opening, and at least one retaining ribbon for securing the rollable section in its rolled-up state is formed on the roof tarp.

* * * * *